(12) United States Patent
Etter

(10) Patent No.: US 7,219,886 B2
(45) Date of Patent: May 22, 2007

(54) CLAMPING CYLINDER HAVING A CLOSURE CAP

(75) Inventor: Ernst Etter, Thalwil (CH)

(73) Assignee: Vischer & Bolli AG, Dubendorf (CH)

( * ) Notice: Subject to any disclaimer, the term of this patent is extended or adjusted under 35 U.S.C. 154(b) by 136 days.

(21) Appl. No.: 11/079,199

(22) Filed: Mar. 15, 2005

(65) Prior Publication Data

US 2005/0206061 A1  Sep. 22, 2005

(30) Foreign Application Priority Data

Mar. 16, 2004  (DE) ................ 20 2004 004 181 U

(51) Int. Cl.
*B23Q 3/00* (2006.01)
*F16B 21/00* (2006.01)
(52) U.S. Cl. ..................... 269/309; 269/310
(58) Field of Classification Search ............. 269/309, 269/32, 310; 279/4.06, 4.12
See application file for complete search history.

(56) References Cited

U.S. PATENT DOCUMENTS

| 6,527,266 B1 * | 3/2003 | Yonezawa et al. ......... 269/309 |
| 2004/0046302 A1 * | 3/2004 | Bernhard et al. .......... 269/309 |
| 2005/0206061 A1 * | 9/2005 | Etter ..................... 269/309 |
| 2006/0055099 A1 * | 3/2006 | Haruna .................... 269/309 |

FOREIGN PATENT DOCUMENTS

| DE | 199 17 005 | 4/1999 |
| DE | 200 03 729 | 7/1999 |
| DE | 20 2004 004 181.2 | 10/2004 |
| EP | 1 264 657 A1 | 6/2002 |
| EP | 1 264 657 B1 | 6/2002 |

* cited by examiner

*Primary Examiner*—Lee D. Wilson
(74) *Attorney, Agent, or Firm*—Berenato, White & Stavish

(57) ABSTRACT

A clamping device for a machine table comprises a clamping plate having a receptacle into which a draw-in bolt is insertable through an opening. A clamping mechanism immobilizes the draw-in bolt in the receptacle. A closure cap is movable inside the receptacle between a closed position and an operating position in which the closure cap is pushed into the receptacle by the draw-in bolt. The draw-in bolt is inserted into the receptacle and immobilized with the clamping mechanism. A centering surface is implemented on the end surface of the closure cap facing toward the outer side of the clamping device and/or on the end surface of the draw-in bolt facing toward the inner side of the clamping device. The centering surface pre-centers the draw-in bolt when it is inserted into the receptacle and its end surface thereby comes into contact with the end surface of the closure cap.

20 Claims, 2 Drawing Sheets

CLAMPING CYLINDER HAVING A CLOSURE CAP

CROSS-REFERENCE TO RELATED APPLICATIONS AND CLAIM TO PRIORITY

This application claims priority under 35 U.S.C. § 119 to Application Number 20 2004 004 181.2, filed Mar. 16, 2004 in the Federal Republic of Germany, the disclosure of which is incorporated herein by reference.

FIELD OF THE INVENTION

The present invention concerns a clamping device for retaining a draw-in bolt on a machine table, a clamping plate, or the like, having a receptacle into which a draw-in bolt is insertable from outside through an insertion opening; a clamping mechanism in order to immobilize the draw-in bolt in the receptacle; and a closure cap that is movable inside the receptacle between a closed position in which the insertion opening of the receptacle is closed off by the closure cap, and an operating position in which the closure cap is pushed into the receptacle by the draw-in bolt, which is inserted into the receptacle and immobilized with the clamping mechanism.

BACKGROUND OF THE INVENTION

The machining of workpieces is often complex, and can encompass a plurality of chip-generating and non-chip-generating working steps on various processing machines in order to produce the finished component from a blank. In all production sequences, it is essential for the workpiece to occupy a defined location on the particular machine tool for each working step.

For this purpose, it is usual in practice first to clamp the workpiece that is to be machined onto a carrier plate, a clamping plate, or the like, and then to clamp the entire unit in place on the particular machine tool by way of several draw-in bolts that are mounted on the back side of the carrier plate and embodied as centering elements, by inserting the draw-in bolts into corresponding quick-release clamping units that are provided on the machine table. In production, the location of the quick-release clamping devices can therefore be regarded as a fixed machine parameter, so that it is necessary only to position the respective workpiece exactly on the carrier plate. The unit made up of the workpiece and carrier plate can then be actually clamped and reclamped on the machines very quickly and without difficulty, with no need for further positioning.

In conventional clamping devices of the kind cited initially, as known for example from DE 200 03 729 U1, the draw-in bolt is inserted into a receptacle of the clamping device which is embodied so that the inserted draw-in bolt is centered by its contact with the inner wall of the receptacle. Retention of the draw-in bolt in the receptacle is accomplished by means of gripping elements that are embodied as resilient clamping tongues.

From EP 1 264 657 A1 it is furthermore known to seal a receptacle of a clamping device in such a way that dirt particles cannot penetrate into it even when the draw-in bolt is removed. For that purpose, a plate-shaped closure cap is inserted into the receptacle and can be moved by a closing piston between two end positions. In its extended end position, in which its end surface facing toward the outer side of the clamping device terminates flush with the surface of the clamping device, the receptacle is protected from contamination. In the retracted end position, the draw-in bolt can be inserted into the receptacle.

With the known clamping devices, it is regarded as disadvantageous to some extent that the draw-in bolt must be inserted in accurately fitted fashion into the receptacle.

SUMMARY OF THE INVENTION

It is therefore the object of the present invention to configure a clamping device of the kind cited initially in such a way that the draw-in bolt can be easily inserted into the opening and is at the same time centered.

This object is achieved according to the present invention in that a centering surface is implemented on the end surface of the closure cap facing toward the outer side of the clamping device and/or on the end surface of the draw-in bolt facing toward the inner side of the clamping device, in order to pre-center the draw-in bolt when it is inserted into the receptacle and its end surface thereby comes into contact with the end surface of the closure cap.

The invention is therefore based on the concept of automatically pre-centering the draw-in bolt, upon introduction into the receptacle, by way of the end surfaces of the draw-in bolt and closure cap that come into contact, so that minor offsets between the draw-in bolt and the receptacle are corrected. Even heavy workpieces can thus be easily and quickly clamped in place on the machine tool.

Advantageously, provision can be made for the end surfaces of the draw-in bolt and closure cap that come into contact with one another to be embodied as two corresponding centering surfaces. It is particularly favorable in this context to configure the end surface of the closure cap in dome-like fashion, and to configure the end surface of the draw-in bolt in a manner complementary to that dome-like end surface. End surfaces thus constituted achieve a good centering effect and are easy to manufacture.

In an embodiment of the invention, provision is further made for the closure cap to be pushed into the closed position by a spring or a hydraulic piston. Both embodiments ensure simple actuation and are robust.

Advantageously, the closure cap can comprise at its lower end a stop that prevents the closure cap from being pushed out of the clamping device beyond the closed position.

Various clamping mechanisms are conceivable in the context of the clamping device according to the present invention. In the known manner described above, for example, the clamping mechanism can comprise several resilient clamping tongues that are movable with elastic deformation between a radially inner clamping position in which they come into engagement with the draw-in bolt inserted in the receptacle, and a radially outer release position, the tongues being preloaded in the direction of the clamping position. In a manner known per se, the clamping mechanism can be provided with an immobilization piston, axially displaceable between an immobilized position and a release position, which is pushed into the immobilized position by at least one compression spring and thereby comes into contact with the clamping tongues in such a way that the clamping tongues are immobilized in the radially inner clamping position. This ensures secure immobilization of the clamping tongues, so that the draw-in bolt does not separate from the clamping device during operation, which might result in material damage or in injury to the user. By pressurization of a pressure space of the immobilization piston, the latter can be raised into its release position, in which context it comes out of contact with the clamping tongues. The draw-in bolt can then be removed from the receptacle, the clamping tongues being spread apart into the release position.

With this embodiment of the invention, the closure cap can comprise in a side wall at least one recess or depression, for example in the form of an annular groove, into which at least one clamping tongue engages when the closure cap is in the closed position, in order to retain the closure cap. When the immobilization piston is in the immobilized position, the clamping tongues are immobilized in the clamping position and therefore the closure cap is also immobilized in the closed position, so that it can protect the receptacle from contamination.

BRIEF DESCRIPTION OF THE FIGURES

Regarding further advantageous embodiments of the inventions, the reader is referred to the explanation below of an exemplifying embodiment with reference to the appended drawings, in which.

DETAILED DESCRIPTION OF THE PREFERRED EMBODIMENT(S)

Figure 1:
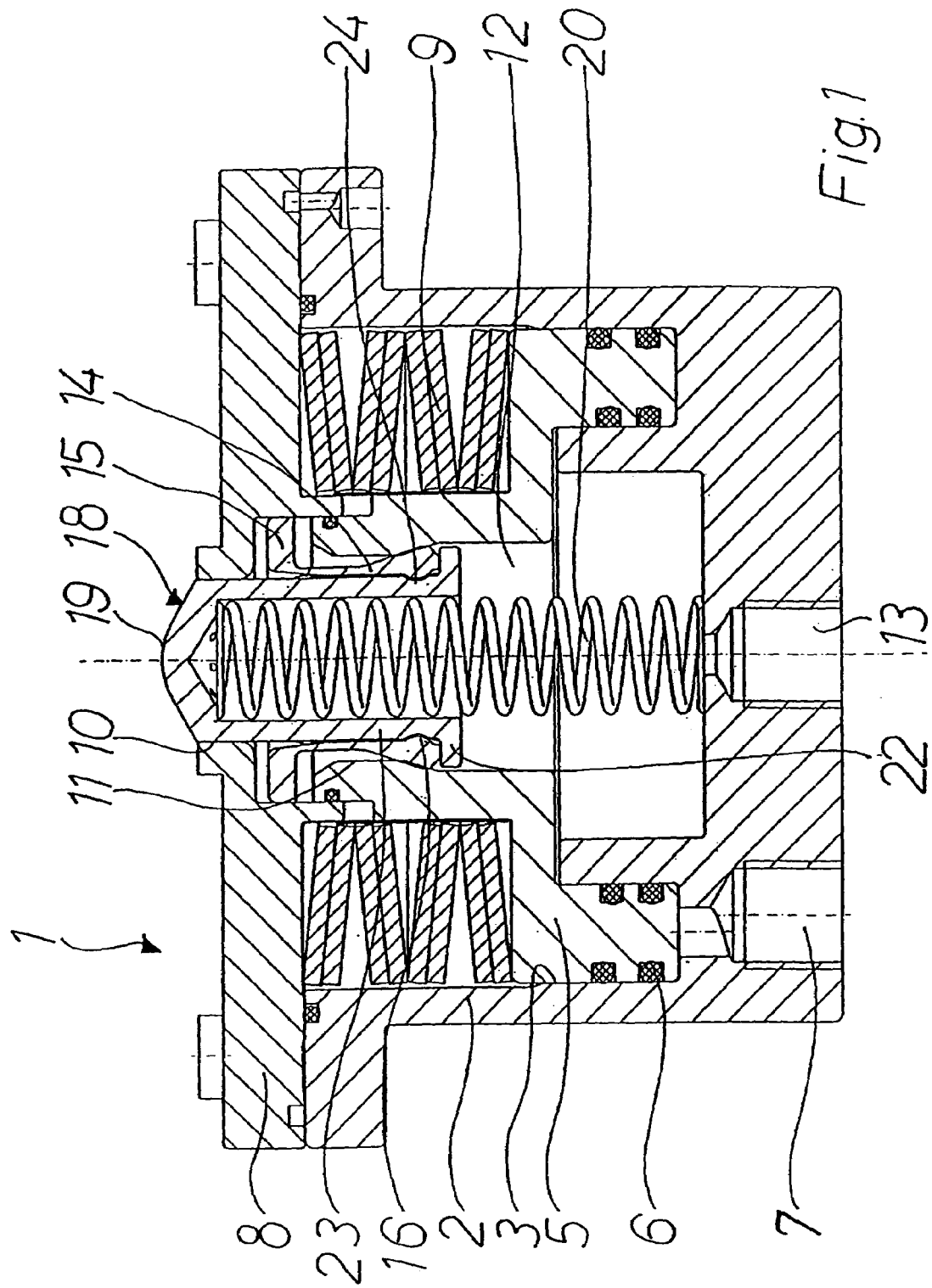
FIG. 1 is a longitudinal section showing an embodiment of a clamping device according to the present invention.
Figure 2:
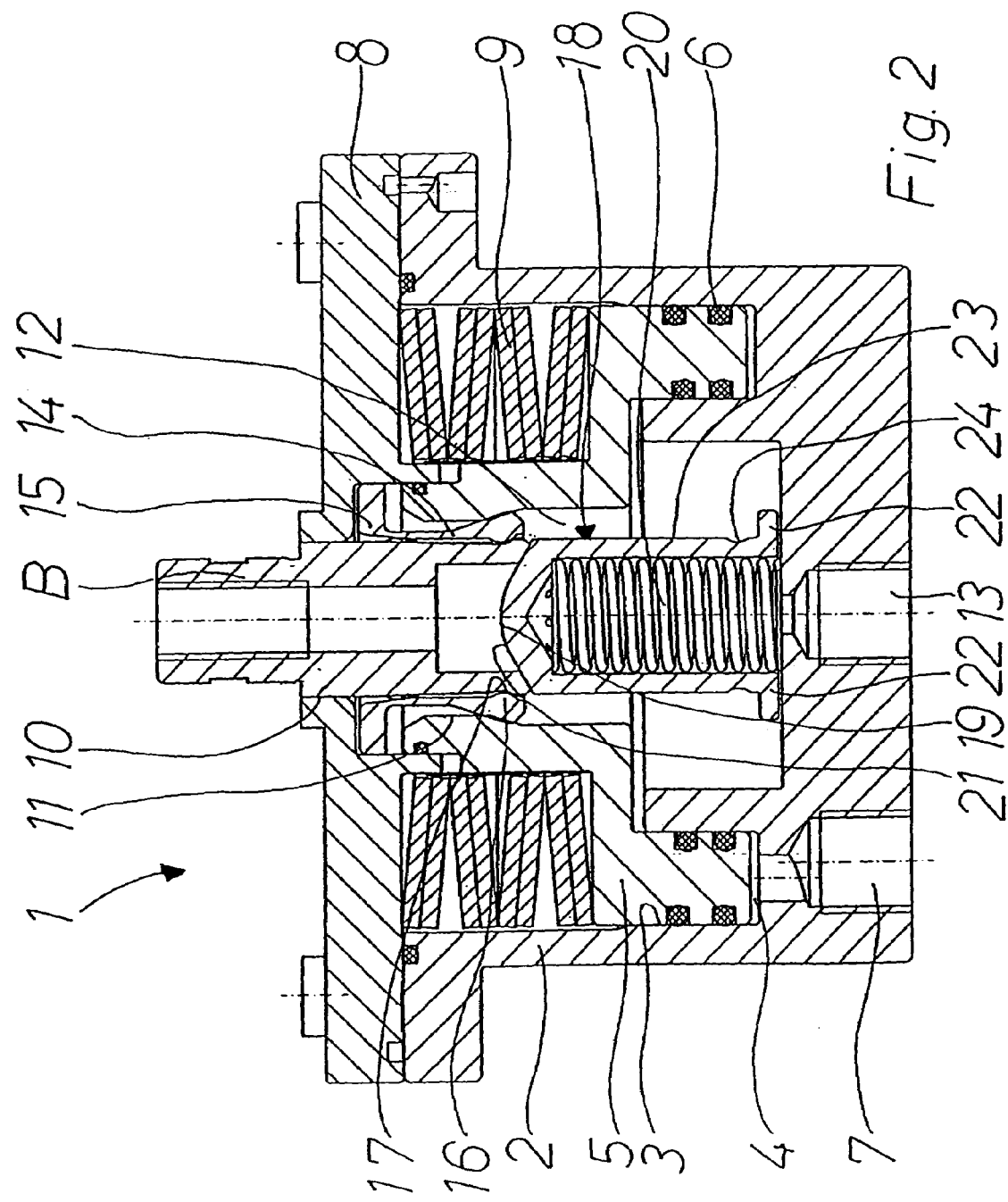
FIG. 2 is a longitudinal section showing the same embodiment as in FIG. 1, with the draw-in bolt inserted and clamped in place.

FIGS. 1 and 2 depict an embodiment of a clamping device 1 according to the present invention that serves to retain a draw-in bolt B on a machine table or the like. Clamping device 1 comprises a housing 2, embodied as a cylinder, that can be attached to the machine table or the like. An immobilization piston 5 is inserted, axially movably between an immobilized position and a release position, into cylinder bore 3 of housing 2 that opens toward the upper side of the housing, forming a pressure space 4; an annular gap between cylinder bore 3 and immobilization piston 5 is sealed with O-rings 6. A conduit 7, configured in housing 2, through which a hydraulic medium such as, for example, oil can be delivered to pressure space 4, opens into the bottom of cylinder bore 3.

The open upper side of housing 2 is closed off by a cover 8 that is attached to housing 2. Arranged between cover 8 and immobilization piston 5 are compression springs 9 that are braced between cover 8 and immobilization piston 5, and that push immobilization piston 5 away from cover 8.

Central passthrough openings 10, 11, which form a receptacle 12 for a draw-in bolt B to be clamped, are implemented in cover 8 and in immobilization piston 5. Opening into the bottom of receptacle 12 for draw-in bolt B is a conduit 13, implemented in the housing, through which compressed air can flow into receptacle 12 in order to clean receptacle 12.

For the retention of draw-in bolt B, there is provided in receptacle 12 a clamping mechanism that comprises several tongue-like clamping elements 14 (the so-called clamping tongues 14), arranged along the periphery of receptacle 12, whose upper ends are held on an annular element 15 attached to cover 8. Clamping tongues 14 can be spread out elastically from a radially inner clamping position, into which they are preloaded, to an outer release position. In the region of their unattached lower ends, clamping tongues 14 each have an engagement lug 16. The latter are in engagement, when clamping tongues 14 are in their clamping position, with an annular groove 17 of draw-in bolt B inserted into clamping device 1, in order to retain the bolt in receptacle 12.

Immobilization piston 5 is pushed into its immobilized position by compression springs 9, and thereby comes into contact with clamping tongues 14 in such a way that it prevents any spreading of clamping tongues 14 from their clamping position into the release position. When immobilization piston 5 is raised, by way of a pressurization of pressure space 4, out of the immobilized position into the release position, it comes out of contact with clamping tongues 14 so that they can be spread radially outward into their release position and draw-in bolt B can be removed from receptacle 12.

A closure cap 18, with which receptacle 12 can be closed off in order to protect it from contamination, is inserted into the receptacle of clamping device 1. Closure cap 18 substantially comprises a sleeve that is closed at its upper end. Closure cap 18 is displaceable in receptacle 12 between a closed position and an operating position. In its closed position, closure cap 18 is positioned in the upper part of receptacle 12 in such a way that it closes off the latter and so that its outward-facing upper end surface 19 also terminates flush with the surface of clamping device 1. In the operating position, closure cap 18 is slid sufficiently far into receptacle 12 that a draw-in bolt can be retained in receptacle 12. Closure cap 18 is pushed from the operating position into the closed position by a spring 20 that is inserted into the central bore of closure cap 18 and is braced between the closed upper end of closure cap 18 and the bottom of receptacle 12.

Upper end surface 19 of closure cap 18 is embodied as a dome-like centering surface, in order to pre-center draw-in bolt B upon insertion into the receptacle. In corresponding fashion, an end surface 21 of draw-in bolt B that comes into contact with end surface 19 of closure cap 18 upon insertion into receptacle 12 is shaped in a manner complementary to that dome-like end surface 19.

Provided at the lower end of closure cap 18 is a flange-like stop 22 that, in the closed position, is in contact with the underside of clamping tongues 14 and thus prevents closure cap 18 from being pushed out of clamping device 1 beyond the closed position.

In order to retain closure cap 18 in its closed position, there is configured in one side wall 23 thereof an annular groove 24 with which clamping tongues 14 are in engagement, the latter being retained in their clamping position by immobilization piston 5. This retention can be released again by raising immobilization piston 5 into its release position.

FIG. 1 shows clamping device 1 in its initial position, in which closure cap 18 is located in its upper closed position. In order to insert into receptacle 12 a draw-in bolt B retained on a component to be clamps, the bolt is first brought into contact with end surface 19 of closure cap 18. Because the two end surfaces 19, 21 of draw-in bolt B and closure cap 18 are embodied as coacting centering surfaces, upon contact with closure cap 18 draw-in bolt B is automatically pre-centered and aligned parallel to receptacle 12.

Pressure space 4 of immobilization piston 5 is then pressurized with a pressure medium, so that immobilization piston 5 is raised against the spring force of compression spring 9 into its release position and draw-in bolt B can be inserted into receptacle 12, clamping tongues 14 being spread out of their clamping position into the release position. Draw-in bolt B is pushed into receptacle 12 until the component attached to draw-in bolt B is resting on clamping device 1, closure cap 18 being pushed downward into its operating position. At the same time, clamping tongues 14 that are preloaded into the clamping position come into engagement with annular groove 17 of draw-in bolt B.

Lastly, the pressurization of pressure space 4 with pressure medium is discontinued, so that compression springs 9 push immobilization piston 5 into its immobilization position, with the result that clamping tongues 14 are retained in their clamping position and the state of clamping device 1 depicted in FIG. 2 is attained.

In reverse order, the retention of clamping tongues 14 is released by the fact that pressure space 4 is pressurized with pressure medium, and immobilization piston 5 is thus pushed into its release position in order to remove draw-in bolt B from receptacle 12. Upon removal of draw-in bolt B, closure cap 18 is pushed upward by spring 20 into its closed position, in which engagement lugs 16 of clamping tongues 14 come into engagement with annular groove 24 of closure cap 18 and thus reach their clamping position. Lastly, clamping tongues 14 are immobilized in their clamping position and closure cap 18 is thus also retained in its closed position, as depicted in FIG. 1, by the fact that the pressurization of pressure space 4 is discontinued so that immobilization piston 5 is brought back into its immobilization position by compression springs 9.

The embodiment of clamping device 1 according to the present invention thus offers the advantage, as compared with conventional embodiments, that draw-in bolt B can be inserted more easily and more quickly into receptacle 12 of clamping device 1.

I claim:

1. A clamping device for retaining a draw-in bolt on a machine table, comprising:
    a clamping plate having a receptacle into which the draw-in bolt is insertable from outside through an insertion opening;
    a clamping mechanism to immobilize the draw-in bolt in the receptacle; and
    a closure cap that is movable inside the receptacle between a closed position in which the insertion opening of the receptacle is closed off by the closure cap, and an operating position in which the closure cap is pushed below the insertion opening of the receptacle by the draw-in bolt,
    which is inserted into the receptacle and immobilized with the clamping mechanism,
    wherein a centering surface is implemented between an end surface of the closure cap an end surface of the draw-in bolt to pre-center the draw-in bolt when the end surfaces of the draw-in bolt and the closure cap contact each other to insert the draw-in bolt into the receptacle.

2. The clamping device as defined in claim 1, wherein the end surfaces of the draw-in bolt and closure cap that come into contact with one another are centering surfaces that correspond to one another.

3. The clamping device as defined in claim 2, wherein the end surface of the closure cap has a convex shape and the end surface of the draw-in bolt (B) is configured in a manner complementary thereto.

4. The clamping device as defined in claim 1, wherein the closure cap is pushed into the closed position by a spring.

5. The clamping device as defined in claim 1, wherein the closure cap is movable by a hydraulic piston.

6. The clamping device as defined in claim 1, wherein the closure cap comprises at least one stop disposed at a lower end of the closure cap opposite from the end surface to prevent the closure cap from being pushed out of the clamping device beyond the closed position.

7. The clamping device as defined in claim 1, wherein the clamping mechanism comprises several resilient clamping tongues that are movable with elastic deformation between a radially inner clamping position in which they come into engagement with the draw-in bolt inserted in the receptacle, and a radially outer release position, the tongues being preloaded in the direction of the clamping position.

8. The clamping device as defined in claim 7, wherein the clamping mechanism further comprises an immobilization piston axially displaceable between an immobilized position and a release position, the immobilization piston being pushed into the immobilized position by at least one compression spring thereby contacting the clamping tongues in such a way that the clamping tongues are immobilized in the radially inner clamping position.

9. The clamping device as defined in claim 7, wherein the closure cap comprises at least one recess in a sidewall thereof into which at least one clamping tongue engages when the closure cap is in the closed position, thereby retaining the closure cap.

10. A clamping device, comprising:
    a housing having an elongated receptacle formed therein to receive a draw-in bolt; and
    an elongated closure cap disposed in the receptacle and having an outer end surface to engage the draw-in bolt, the closure cap being movable between a first position in which the outer end surface of the closure cap forms a continuous surface with a top opening portion of the receptacle when the draw-in bolt does not engage the closure cap and a second position in which the closure cap is disposed below the top opening portion at a bottom inner portion of the receptacle when the draw-in bolt engages the closure cap.

11. The clamping device as defined in claim 10, wherein the closure cap includes
    a plurality of elongated side walls extending along a longitudinal axis of the receptacle, and
    a closed top portion that connects top ends of the sidewalls and extends along a direction that is perpendicular to the longitudinal axis of the receptacle.

12. The clamping device as defined in claim 11, wherein the closure cap further includes:
    one or more stop flanges disposed on bottom ends of the sidewalls to extend from the sidewalls away from the longitudinal axis of the receptacle to engage an inner portion of the receptacle to prevent the closure cap from being removed from the top opening portion of the receptacle; and
    a spring member disposed in the closure cap between the sidewalls thereof and having a first end to engage an inner end surface of the of the closed top portion of the closure cap and a second end to engage the bottom inner portion of the receptacle.

13. The clamping device as defined in claim 10, wherein the outer end surface of the closure cap is a curved surface.

14. The clamping device as defined in claim 13, wherein the draw-in bolt has a curved end surface to complement the curved surface of the closure cap to pre-center the draw-in bolt prior to inserting the draw-in bolt into the receptacle.

15. The clamping device as defined in claim 10, wherein the closure cap member comprises a spring member to bias the closure cap in the first position such that the closure cap is moved to the second position against the bias of the spring, as the draw-in bolt is inserted into the receptacle.

16. The clamping device as defined in claim 10, wherein the housing comprises a conduit disposed therein at the bottom inner portion of the receptacle, the conduit extending through the housing along a longitudinal axis of the receptacle such that compressed air is applied to the receptacle through the conduit to clean the receptacle.

17. The clamping device as defined in claim 10, further comprising:
an immobilization part disposed in the housing to immobilize the draw-in bolt in the receptacle, when the draw-in bolt is inserted in the receptacle.

18. A clamping device, comprising:
a draw-in bolt having an end surface;
a housing having a receptacle in which the draw-in bolt is insertable; and
a closure cap member having sidewalls slidably disposed in the receptacle and a non-planar end surface connected to the sidewalls, the non-planar end surface having a shape that complements the end surface of the draw-in bolt to center the draw-in bolt on the non-planar end surface such that the closure cap member is movable with respect to the housing by insertion and removal of the draw-in bolt.

19. The clamping device as defined in claim 18, wherein the closure cap member is movable between a closed position when the draw-in bolt is not inserted to the receptacle such that the non-planar end surface extends along an opening in the receptacle to close off the opening, and an open position when the draw-in bolt pushes the cap closure member toward a bottom portion of the receptacle.

20. The clamping device as defined in claim 18, wherein the closure member includes a spring member to bias the closure cap member toward an opening in the receptacle.

* * * * *